US011611541B2

United States Patent
Huang et al.

(10) Patent No.: US 11,611,541 B2
(45) Date of Patent: Mar. 21, 2023

(54) SECURE METHOD TO REPLICATE ON-PREMISE SECRETS IN A CLOUD ENVIRONMENT

(71) Applicant: Citrix Systems, Inc., Fort Lauderdale, FL (US)

(72) Inventors: Feng Huang, Cambridge (GB); Jean-Luc Giraud, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 114 days.

(21) Appl. No.: 16/056,848

(22) Filed: Aug. 7, 2018

(65) Prior Publication Data

US 2020/0053059 A1   Feb. 13, 2020

(51) Int. Cl.
*H04L 9/40* (2022.01)
*H04L 9/32* (2006.01)

(52) U.S. Cl.
CPC .......... *H04L 63/0442* (2013.01); *H04L 9/321* (2013.01); *H04L 63/0823* (2013.01)

(58) Field of Classification Search
CPC .................................................. H04L 63/0442
See application file for complete search history.

(56) References Cited

U.S. PATENT DOCUMENTS

| | | | | |
|---|---|---|---|---|
| 7,143,052 B2 * | 11/2006 | LaSalle | ................ | G06Q 10/063 705/7.33 |
| 8,842,841 B2 * | 9/2014 | Hook | ................. | H04L 9/14 380/284 |
| 8,953,786 B2 * | 2/2015 | Ramaswamy | ............ | H04L 9/14 380/28 |
| 9,703,976 B1 | 7/2017 | Brandwine | | |
| 9,819,656 B2 * | 11/2017 | Carlson | ................. | H04L 63/045 |
| 2006/0242415 A1 | 10/2006 | Gaylor | | |
| 2011/0320805 A1 * | 12/2011 | Chaves | ............... | H04L 63/0428 713/150 |

(Continued)

FOREIGN PATENT DOCUMENTS

WO    2016183066 A1    11/2016

OTHER PUBLICATIONS

Silvano Da Ros, Content Networking Fundamentals, Mar. 2006, Cisco Press, Indianapolis.*

(Continued)

*Primary Examiner* — Michael R Vaughan (57) ABSTRACT

Systems and methods for secure sharing of sensitive information in a computing environment. The methods comprise, by a first entity of a first computing environment receiving sensitive information of the first computing environment, receiving a request to share the sensitive information from a second entity of the first computing environment, and determining whether the second entity is a trusted entity included in a list of trusted entities held by a configuration service associated with a second computing environment. If the second entity is not a trusted entity, determining whether the second entity can establish trust by validating a subscription of the second entity with a directory service, and validating a digital certificate corresponding to the second entity with a certificate authority. If the second entity can establish trust or is a trusted entity, sharing the sensitive information with the second entity so as to enable operation of the second entity.

20 Claims, 5 Drawing Sheets

(56) References Cited

U.S. PATENT DOCUMENTS

| | | |
|---|---|---|
| 2012/0321086 A1* | 12/2012 | D'Souza ............. H04L 63/0428 |
| | | 380/278 |
| 2014/0020072 A1 | 1/2014 | Thomas |
| 2014/0047513 A1* | 2/2014 | van 't Noordende .. G06F 21/44 |
| | | 726/4 |
| 2014/0351586 A1* | 11/2014 | Hook ........................ H04L 9/14 |
| | | 713/164 |
| 2015/0058629 A1 | 2/2015 | Yarvis et al. |
| 2016/0080380 A1 | 3/2016 | Dawoud Shenouda Dawoud et al. |
| 2016/0099919 A1 | 4/2016 | Daniels et al. |
| 2016/0099920 A1 | 4/2016 | Meuleman et al. |
| 2016/0227272 A1* | 8/2016 | Hatambeiki ....... H04N 21/2541 |
| 2016/0234175 A1 | 8/2016 | Zhao |
| 2016/0330177 A1 | 11/2016 | Singleton, IV et al. |
| 2017/0005990 A1 | 1/2017 | Birger et al. |
| 2017/0060777 A1 | 3/2017 | Sivaramamurthy et al. |
| 2017/0288866 A1 | 10/2017 | Vanek et al. |
| 2017/0302666 A1 | 10/2017 | Dawoud Shenouda Dawoud et al. |

OTHER PUBLICATIONS

International Search Report and Written Opinion dated Jul. 19, 2019 for PCT/US2019/029604.

* cited by examiner

SECURE METHOD TO REPLICATE ON-PREMISE SECRETS IN A CLOUD ENVIRONMENT

BACKGROUND

Statement of the Technical Field

The present disclosure relates generally to computing systems. More particularly, the present disclosure relates to implementing systems and methods for replication of sensitive information in a computing environment that enables enhanced security.

Description of the Related Art

Cloud computing allows a user to utilize applications or services running on a remotely located computer rather than on the user's local computer. For example, data may be processed in the cloud by forwarding the data from a client computer to a server computer, where the data is processed before returning the processed data back to the client computer. This way, the client computer offloads processing tasks to computers in the cloud. While cloud computing has many advantages, information integrity and security is a significant challenge for system administrators. Because the data to be processed needs to be transferred over a computer network, the data is especially vulnerable to online computer security threats, such as eavesdropping, and interception, to name a few examples. Hence, information security is of paramount importance in providing external services to one or more users.

SUMMARY

This document concerns methods and system for secure sharing of sensitive information in a computing environment. The methods comprise by a first entity of a first computing environment receiving sensitive information corresponding to the first computing environment receiving a request to share the sensitive information between the first entity and a second entity from the second entity of the first computing environment, and determining whether the second entity is a trusted entity included in a list of trusted entities held by a configuration service associated with a second computing environment. If the second entity is not a trusted entity included in the list of trusted entities, determining whether the second entity can establish trust by validating a subscription of the second entity with a directory service, and validating a digital certificate corresponding to the second entity with a certificate authority. The method further comprises in response to determining that the second entity can establish trust or is a trusted entity, sharing the sensitive information with the second entity so as to enable operation of the second entity. The first entity may be a first connector of the first computing environment and the second entity may be a second connector of the first computing environment.

In some scenarios, the methods may also comprise by the configuration service associated with the second computing environment, adding the second entity to the list of trusted entities if the second entity can establish trust. Alternatively, if the second entity cannot establish trust, the first entity may deny the request to share sensitive information with the second entity.

In certain other scenarios, the methods further comprise generating an encryption key for encrypting the sensitive information, encrypting the sensitive information using the encryption key, transmitting the encryption key to the configuration service for storage, and transmitting the encrypted sensitive information to the first entity.

In one or more scenarios determining whether the second entity can establish trust may comprise joining the directory service, generating a private public key pair that includes a private key and a public key, receiving the digital certificate corresponding to the second entity including the public key from the certificate authority, and transmitting a request to join a list of trusted entities to the configuration service. The request may comprise the digital certificate corresponding to the second entity. The directory service includes information about one or more trusted entities.

In a scenario, determining whether the second entity can establish trust may comprise receiving from the configuration service the digital certificate corresponding to the second entity by the first entity, where he digital certificate includes a public key of a private public key pair generated by the second entity.

Alternatively and/or additionally, the methods may comprise sharing the sensitive information with the second entity so as to enable operation of the second entity by transmitting the sensitive information to the second entity via the configuration service. The first entity may also encrypt the sensitive information with a public key of a private public key pair generated by the second entity and included in the digital certificate before the transmission. Alternatively, the methods may comprise, by the second entity, receiving the transmitted encrypted sensitive information and decrypting the received encrypted sensitive information using the private key. The configuration service may then add the second entity to the list of trusted entities in response to decryption of the encrypted sensitive information by the second entity.

In one or more scenarios receiving the request from the second entity to share the sensitive information is in response to the following: addition of the second entity to the first computing environment, a user request to share the sensitive information, or a request to access a first resource via the second entity using the sensitive information, and/or combination thereof.

BRIEF DESCRIPTION OF THE DRAWINGS

This disclosure is facilitated by reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The examples provided herein may be embodied in other specific forms without departing from its spirit or essential characteristics. The described embodiments are to be considered in all respects only as illustrative and not restrictive. The scope of the disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics described in this disclosure may be combined in any suitable manner in one or more embodiments. One skilled in the relevant art will recognize, in light of the description herein, that the examples described herein can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The term "sensitive information," as used herein, refers to data protected from unauthorized access to safeguard the privacy and/or security of a user or an entity. Examples may include access credentials, personal information, medical information, financial information, unique identifiers such as social security information, biometric data, trade secrets, customer and supplier information, employee data, or the like.

Often times, in a computing environment, some resources of an enterprise are externally managed and located within a computing environment of a service provider (e.g., a external service provider) while other resources of the enterprise are internally managed by the enterprise and located within its own servers or other computing devices. External computing environments or servers (e.g., cloud servers), however, are public-facing and untrusted, and as such, some entities may be reluctant to use applications that require access to sensitive information. Furthermore, a user may send sensitive information (such as identity credentials) to an internally managed application or other resources located in one of the enterprise's computing devices where the sensitive information may be transmitted from the user's device to the internal resource via an external computing environment provided by the service provider. As a result, the service provider may disadvantageously have access to the sensitive information. For example, a service provider may control access to various resource or applications via a single sign-on system where a password manager (a software application/agent/process/etc.) running on the network or system of the service provider is responsible for providing user credentials to secure applications. The user credentials for a particular user are usually stored in encrypted form in a location accessible to the password manager after being encrypted using a cryptographic key associated with the user. Requests by an authenticated user to access a secure application which require a user credential are intercepted by the password manager, and hence may be accessible by the service provider. Additionally, the storing of an intact cryptographic key associated with the user represents a security vulnerability as the key could be stolen by malicious entities thereby exposing the sensitive information such as identity credentials.

To prevent an external public facing computing environment from gaining access to sensitive information, some methods may include encrypting the sensitive information using, for example, an encryption key. The method may also include storing the encryption key at a first computing environment (e.g., the public facing computing environment), and the encrypted sensitive information at a second computing environment (e.g., a connector or another server of the internal computing environment of the enterprise itself) such that the first computing environment never has access to the sensitive information. Often times, the internal computing environment of the enterprise may deploy multiple servers (e.g., connectors) for providing sensitive information to one or more resources of the internal computing environment in order to provide redundancy, efficiency, and high-availability reason. However, the multiple severs may not necessarily have direct communication amongst themselves. As such, secure sharing or replication of sensitive information between such servers remains a challenge, for example, when a new server is set up and/or needs access to sensitive information after the sensitive information has been encrypted and stored at a first server, or when the sensitive information is updated.

Figure 1:
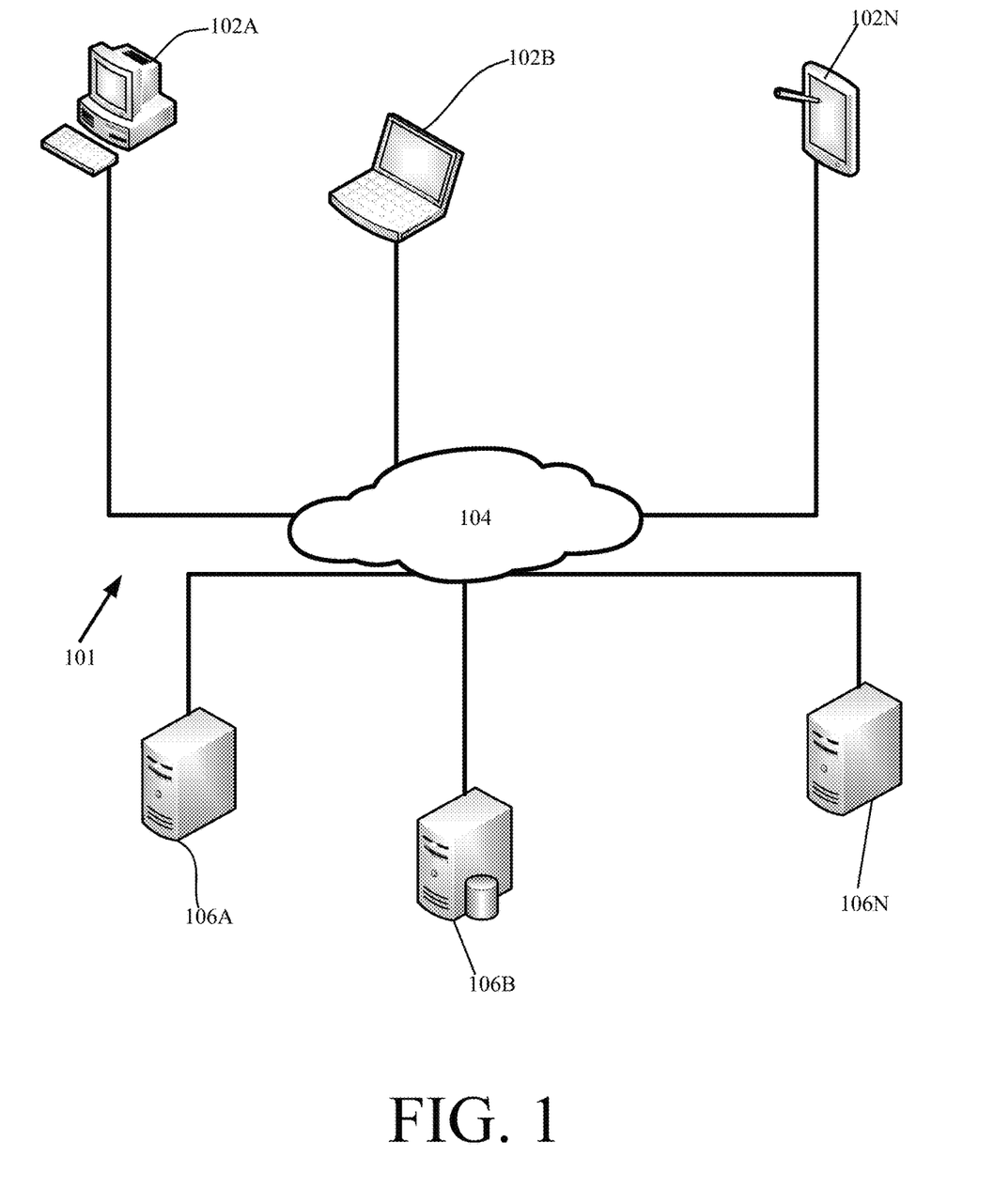
FIG. 1 is an illustration of an exemplary system.

Referring now to FIG. 1, a schematic block diagram illustrating an example computing environment in which the embodiments described herein may be implemented is shown. FIG. 1 illustrates one embodiment of a computing environment 101 that includes one or more client machines 102A-102N (generally referred to herein as "client machine(s) 102A-N") in communication with one or more servers 106A-106N (generally referred to herein as "server(s) 106A-N"). Installed in between the client machine(s) 102A-N and server(s) 106A-N is a network 104.

In one embodiment, the computing environment 101 can include an appliance installed between the server(s) 106A-N and client machine(s) 102A-N (not shown here). This appliance may manage client/server connections, and in some cases can load balance client connections amongst a plurality of backend servers. For example, the appliance may be a management server and/or another server such as a computing environment connector (hereafter referred to as a "connector") that may provide a communication link between the client machine(s) 102A-N and the server(s) 106A-N for accessing computing resources (cloud hardware and software resources) hosted by the server(s) 106A-N in a computing environment. The computing environment hardware and software resources may include private and/or public components. For example, a computing environment may be configured as a private computing environment or a computing device to be used by one or more particular customers or client computers and/or over a private network. In other embodiments, public or public-private computing environments may be used by other customers over open or closed networks.

The client machine(s) 102A-N can in some embodiment be referred to as a single client machine or a single group of client machines, while server(s) 106A-N may be referred to as a single server or a single group of servers. In one embodiment, a single client machine communicates with more than one server, while in another embodiment a single server communicates with more than one client machine. In yet another embodiment, a single client machine communicates with a single server.

Client machine(s) 102A-N can, in some embodiments, be referenced by any one of the following terms: client machine(s); client(s); client computer(s); client device(s); client computing device(s); local machine; remote machine; client node(s); endpoint(s); endpoint node(s); or a second machine. The server(s) 106A-N, in some embodiments, may be referenced by any one of the following terms: server(s), local machine; remote machine; server farm(s), host computing device(s), or a first machine(s).

In one embodiment, one or more of the client machine(s) 102A-N can be a virtual machine. The virtual machine can be any virtual machine, while in some embodiments the virtual machine can be any virtual machine managed by a hypervisor developed by Citrix Systems, IBM, VMware, or any other hypervisor. In other embodiments, the virtual machine can be managed by a hypervisor executing on a server or a hypervisor executing on a client machine.

The client machine(s) 102A-N can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include one or more client machine(s) 102A-N that display application output generated by an application remotely executing on a server(s) 106A-N or other remotely located machine. In these embodiments, the client machine(s) 102A-N can display the application output in an application window, a browser, or other output window. In one embodiment, the application is a desktop, while in other embodiments the application is an application that generates a desktop.

The server(s) 106A-N, in some embodiments, execute a remote presentation client or other client or program that uses a thin-client or remote-display protocol to capture display output generated by an application executing on a server and transmit the application display output to a remote client machine(s) 102A-N. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server(s) 106A-N such that the server(s) 106A-N are logically grouped together into a server farm. The server farm can include servers that are geographically dispersed and logically grouped together in a server farm, or servers that are located proximate to each other and logically grouped together in a server farm. Geographically dispersed servers within a server farm can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm may be administered as a single entity, while in other embodiments the server farm can include multiple server farms.

In some embodiments, a server farm can include server(s) 106A-N that execute a substantially similar type of operating system platform (e.g., WINDOWS, manufactured by Microsoft Corp. of Redmond, Wash., UNIX, LINUX or macOS). In other embodiments, the server farm can include a first group of servers that execute a first type of operating system platform, and a second group of servers that execute a second type of operating system platform. The server farm, in other embodiments, can include servers that execute different types of operating system platforms.

In some embodiments, computing environment 101 can include more than one server(s) 106A-N such that the server(s) 106A-N are divided into one or more sub-group, each of which is managed and/or operated by a different entity. For example, a first entity may operate and/or manage a first sub-group of server(s) on premise, in a private or in a public computing device or environment, a second entity may operate and/or manage a second sub-group of server(s) on premise, in a private or in a public computing device or environment, a third entity may operate and/or manage a third sub-group of server(s) on premise, in a private or in a public computing device or environment, and so on.

The server(s) 106A-N, in some embodiments, can be any server type. For example, a server can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. In some embodiments, a server may be a RADIUS server that includes a remote authentication dial-in user service. In embodiments where the server comprises an appliance, the server can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from one or more client machine(s) 102A-N, forwards the request to a second server 106B, and responds to the request generated by the client machine(s) 102A-N with a response from the second server 106B. The first server 106A can acquire an enumeration of applications available to the client machine(s) 102A-N as well as address information associated with an application server hosting an application identified within the enumeration of applications. The first server 106A can then present a response to the client's request using a web interface, and communicate directly with the client machine(s) 102A-N to provide the client machine(s) 102A-N with access to an identified application.

The server(s) 106A-N can, in some embodiments, execute any one of the following applications: a thin-client application using a thin-client protocol to transmit application display data to a client; a remote display presentation application, or the like. Another embodiment includes a server that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server that executes one or more hosted servers applications (e.g., WEBEX provided by Cisco, Inc).

Client machine(s) 102A-N can, in some embodiments, be a client node that seeks access to resources provided by a server. In other embodiments, the server(s) 106A-N may provide client machine(s) 102A-N with access to hosted resources. The server(s) 106A-N, in some embodiments, may function as a master node such that it communicates with one or more client machine(s) 102A-N or server(s) 106A-N. In some embodiments, the master node can identify and provide address information associated with a server hosting a requested application, to one or more clients or servers. In still other embodiments, the master node can be a server farm, a client machine, a cluster of client nodes, or an appliance.

One or more client machine(s) 102A-N and/or one or more server(s) 106A-N can transmit data over a network 104 installed between machines and appliances within the computing environment 101. The network 104 can comprise one or more sub-networks, and can be installed between any combination of the client machine(s) 102A-N, server(s) 106A-N, computing machines and appliances included within the computing environment 101. In some embodiments, the network 104 can be: a local-area network (LAN); a metropolitan area network (MAN); a wide area network (WAN); a primary network comprised of multiple sub-networks located between the client machines 102A-N and the servers 106A-N; a primary public network with a private sub-network; a primary private network with a public sub-network 4; or a primary private network with a private sub-network. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
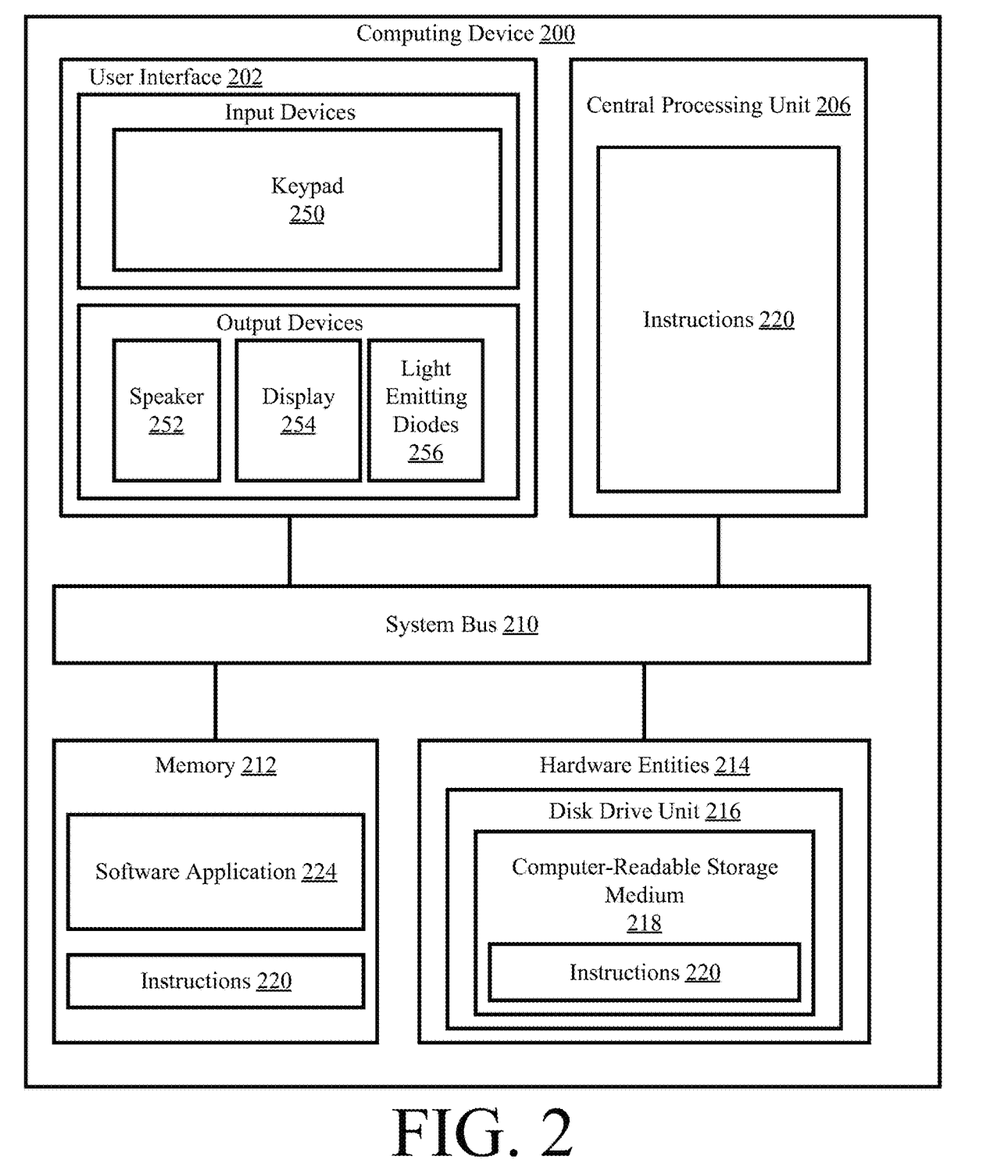
FIG. 2 is an illustration of an exemplary computing device.

Referring now to FIG. 2, there is provided a detailed block diagram of an exemplary architecture for a computing device 200, where the client machine 102 and server 106 illustrated in FIG. 1 can be deployed as and/or executed on any embodiment of the computing device 200. As such, the following discussion of computing device 200 is sufficient for understanding client machine(s) 102 and/or server(s) 106 of FIG. 1.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to facilitate sharing or replication of sensitive information between the entities or servers of a secured enterprise computing environment (e.g., connectors). As such, the computing device 200 of FIG. 2 implements at least a portion of a method for sharing and/or replication of sensitive information in a computing environment via a plurality of communication channels, as discussed below.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface 202 can include input devices (e.g., a keypad 250) and output devices (e.g., speaker 252, a display 254, and/or light emitting diodes 256), which facilitate user-software interactions for controlling operations of the computing device 200.

At least some of the hardware entities 214 perform actions involving access to and use of memory 212, which can be a RAM, a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies, as described herein.

In some scenarios, the hardware entities 214 include an electronic circuit (e.g., a processor) programmed for facilitating sharing and/or replication of sensitive information between the entities or servers of a secured enterprise computing environment (e.g., the connectors). In this regard, it should be understood that the electronic circuit can access and run a software application 224 installed on the computing device 200. The functions of the software application 224 will become apparent as the discussion progresses.

Computing device 200 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 3:
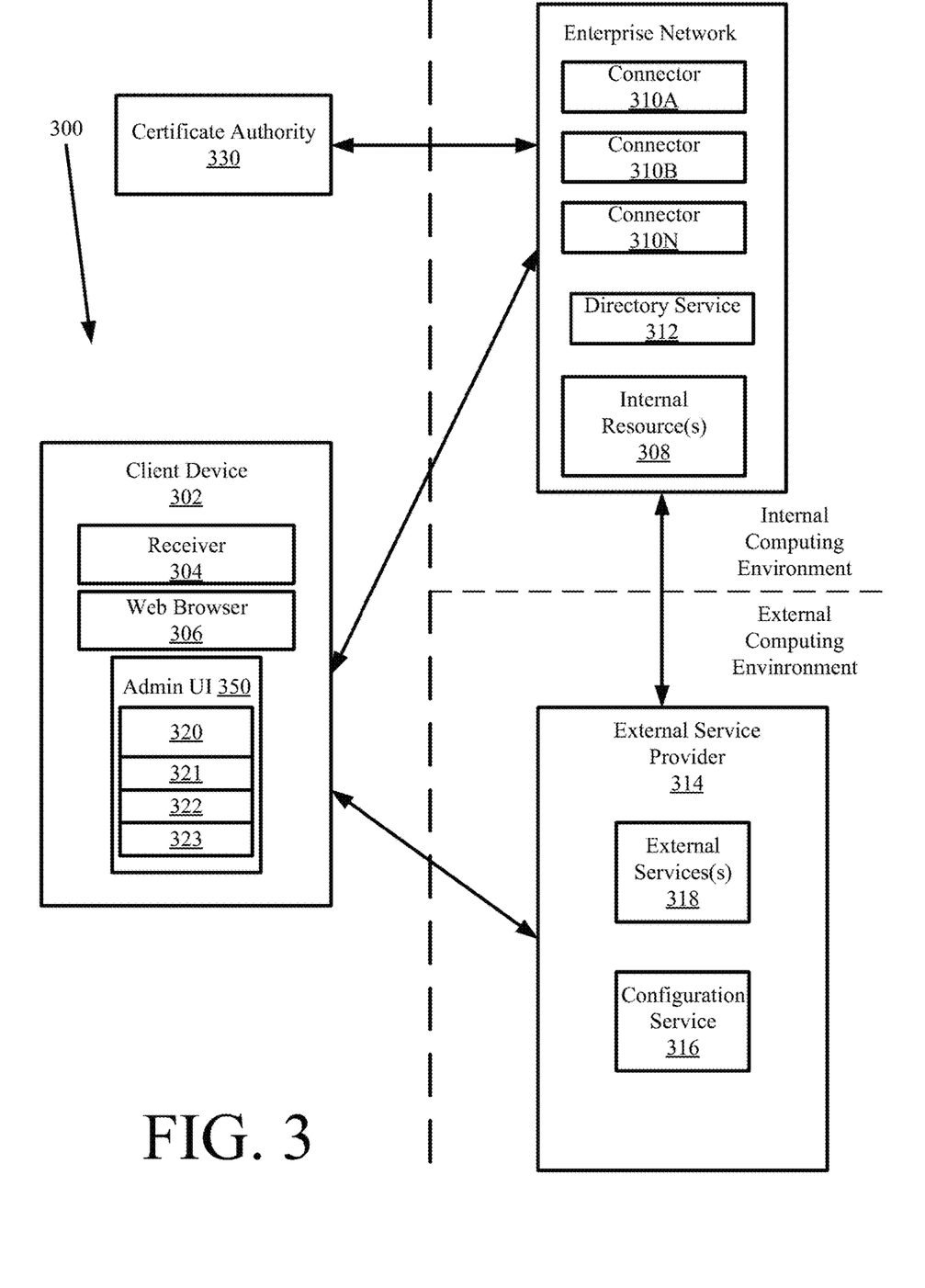
FIG. 3 is an illustration of an exemplary computing environment.

As shown in FIG. 3, the computing environment 300 comprises an external service provider 314 for providing public services and resources (i.e., external services 318). The computing environment further comprises a client device 302, and an internal computing environment comprising a connector 310A-N which facilitates communications between the internal computing environment and the external computing environment.

The system 300 may be in the form of a computing environment in which some resources of an enterprise are externally managed and located within an external computing environment managed by an external service provider while other resources of the enterprise are internally managed by the enterprise and located within the enterprise's own servers or other computing devices (internal resources 308). As used herein, variations of the term "internal" may refer to resources and applications managed by an enterprise itself and/or stored on one or more computing devices controlled by the enterprise (i.e., on a trusted internal computing environment) and not controlled by an external service provider. As an example, a resource may be stored at an on-premises server of the enterprise for remote access by authorized users associated with the enterprise. For instance, a particular software application (e.g., an internal resource) may be stored on a server controlled and managed by an employer, and may be accessed by one or more of its employees. As used herein, variations of the term "external" may refer to resources and applications managed by an external service provider and/or are stored on one or more computing devices controlled by the external service provider (i.e., untrusted computing environment based on its separation from the more secure and "trusted" enterprise network). As an example, an external resource may be stored at a server of the external service provider for access by authorized users associated with the enterprise. In such an example, the external resource may also be associated with the enterprise. Resources (external and/or internal) may include, without limitation, a network, a file, data, a computing device, an application, a module, a service, a function, or any other entity.

A user of a computing environment (e.g., computing environment 300) may wish to access an internal resource installed on a geographically remote internal computing device and/or access or use an external resource located on an external server. The user may connect and/or otherwise communicate with the internal resource and/or the external resource via an external service. In some instances, the user may have to provide the identity credentials (e.g., username and password) to the internal resource and/or the external resource for authentication in order to gain access to the internal resource and/or the external resource. In such instances, the identity credentials may be reversibly encrypted and sent to the internal resource and/or the external resource via the external service, which may then be decrypted and used by the internal resource and/or the external resource as will be discussed in further detail below. It will be understood that other types of sensitive information may also be reversibly encrypted and sent to the internal resource and/or the external resource via the external service using principles described herein.

The computing environment 300 may include an external services provider 314 to provide public services and resources. External services provider 314 may include applications and/or other resources stored in its computing devices (not shown) that users can access over the Internet. External services provider 314 may also transfer information from a particular internal computing device to another internal computing device at different premises of an enterprise that might not be part of external services provider 314. As an example, a computing device that is part of an enterprise computing environment located at a particular geographic location may send information via the external computing environment to another computing device that is also part of the enterprise computing environment (or may be a different computing device of the enterprise) located at a different geographic location.

The external services provider 314 may include various external resources and/or services ("external service(s) 318"). Examples of external services may include, without limitation, configurations services, single-sign on password services for on-premises active directories, authentication services (e.g., knowledge based authentication services, $2^{nd}$ factor authentication services, etc.), self-service password reset services (SSPR services), on-premises active directory access services, data store access services, or the like.

In an embodiment, a configuration service may handle all inter service communication within the external computing environment for the external services provider 314 (and/or the internal resources). The configuration service 316 may hold and manage a list of all services for the external services provider, allowing them to advertise their addresses, or endpoints including the functionality that they provide. Only after a service successfully registers with the configuration service will it become active and able to communicate with other services and applications. Once done, the configuration service 316 will share a listing of all active and registered services as being active services. The configuration service 316 may store any service directory or list and related information into a configuration storage. The configuration storage may include any type and form of storage and/or memory, such as those described in connection with FIGS. 1 and 2. The information related to each service may be stored separately or together in the configuration storage and may be stored in any type of format. In an embodiment, the configuration service 316 may also store identity credentials, encryption keys, sensitive information, or the like. The configuration service 316 is further configured to store a real-time list of trusted connectors configured to store sensitive information in the enterprise internal computing environment, and for transmitting the requests for sharing the sensitive information from new servers (e.g., connectors) to one or more of the trusted servers (e.g., connectors) of the enterprise.

The computing environment 300 may also include a client device 302, which may be a personal computer, laptop, tablet, smartphone, etc. and may include one or more components of a computing device discussed above. In an embodiment, the client device 302 may be a remote computing device such as user's personal device (e.g., the user may own client device 302) and may be able to login and/or otherwise access the internal computing environment and/or the external after the user has been authenticated. In other instances, client device 302 may be owned by the enterprise managing and controlling the internal computing environment (e.g., an employer-provided laptop). In such instances, when the user connects to the client device 302 to a terminal at the premises of the enterprise, client device 302 may be part of the internal computing environment. Otherwise, when the user uses client device 302 outside of the premises of the enterprise (e.g., at the user's home), client device 302 might not be part of the internal computing environment but may be able to login and/or otherwise access the internal computing environment after the user has been authenticated (e.g., via a virtual private network (VPN) connection).

The client device 302 may include a web browser 306 and a program such as a receiver 304, which may be a client software installed on client device 302. The receiver 304 may enable the client device 302 to access internal and/or external services. The web browser 306 may enable the client device 302 to securely access certain applications that are managed, configured, and/or provided by an external service provider but executed on the client device 302 (rather than via a remote session). This allows a user to take advantage of local processing power while still allowing administrators to centrally manage licensing and configuration. For example, an administrator can configure and publish, for example, an encryption application, an authentication application, or the like, which may be executed on the client device 302 to take advantage of the local processor without incurring network delays. Such applications may be published for use by the client device 302 by for example, an Administration User Interface ("Admin UI") 350. Other examples may include, without limitation, graphics UI, low-level software development kit (SDK), or the like. In another example, client device 302 may, using receiver 304, securely access applications, virtual desktops and data stored in the internal and/or external computing environments. In an example, receiver 304 may be a Citrix Receiver developed by Citrix Systems, Inc. of Ft. Lauderdale, Fla.

The client device 302 may also include a data encryption module 320 configured for encryption of sensitive information. Alternatively and/or additionally, the client device may access and use a data encryption module 320 configured for encryption of sensitive information published by an Admin UI 350 and accessed by the client device 302 using a web browser 304. The data encryption module 320 may include a key generator 321, a key exchange module 322, and an encryptor 323. The key generator 321 may generate symmetric and/or asymmetric encryption keys (discussed below) for encryption of sensitive information. The key may be generated using a random key generator, a pseudo-random key generator, or any other key generator.

The key exchange module 322 may be configured for securely transmitting one or more symmetric or asymmetric encryption keys to the configuration service 316 (or another external entity) of the external computing environment. The configuration service 316 (or another external entity) may store the encryption keys and may transmit the stored encryption keys to an internal resource and/or external resource or service. The encryptor 323 may be configured to reversibly encrypt data such as sensitive information with an encryption key generated by the key generator 321 to create encrypted data. It should be clear that the encryptor 323 can encrypt the data by performing any type of manipulation on the data now or hereafter known to those skilled in the art. In one embodiment, the encryptor 323 may be a software module that executes mathematical algorithms on the key and the sensitive information to create the encrypted sensitive information. Those skilled in the art will recognize that exact encryption techniques used may vary within the scope of the embodiments described herein.

Referring back to FIG. 3, the internal computing environment of the computing environment 300 may also include one or more connectors 310A, 310B . . . 310N, which may analyze, intercept and/or forward messages being sent to the internal computing environment from the external computing environment, and vice versa. In an embodiment, one or more of the connectors 310A, 310B . . . 310N may not be a part of the internal computing environment, and may be included in a different network. The internal computing environment may also include one or more internal resources 308. A connector 310A-N may be configured to facilitate communications between the services provided by the external service provide (external service(s) 318) and the internal resource(s) 308. In an embodiment, the connectors 310A, 310B . . . 310N may include or may access one or more authentication modules or services for authenticating a user requesting access to a secure resource. An authentication module may authenticate a user based on identity credentials such as, without limitation, password-based authentication, knowledge based authentication, biometric based authentication, $2^{nd}$ Factor authentication, or the like.

In an embodiment, an external service 318 maybe configured such that it may require and/or cause one or more actions to be performed by an internal resource 308 during the provision of the external service 318. However, before authorizing the performance of such an action, the internal resource 308 may require the presentation of sensitive information (e.g., a password). For example, execution of a password reset service for changing a password associated with an internal resource (e.g., on-premises active directory) using an external service (e.g., an SSPR service) requires the SSPR service to cause the on-premises active directory to perform the password reset. However, before the on-premises directory may authorize the password reset, it may require the SSPR service to provide sensitive information such as an old password, authentication information for authenticating a user, or the like. However, storing such sensitive information in the external service 318 may lead to security issues.

The internal computing environment of the computing environment 300 may also include a directory service 312 (e.g., active directory). In an embodiment, the directory service 312 may hold and manage a list of all connectors 310A-N available to and/or included in the internal computing environment including the functionality that they provide. Only after a connector 310 successfully registers with the active directory 312 will it be allowed to establish a communication link between the internal computing environment and an external service or resource. When a new connector is added, the new connector can be subscribed to the directory service 312 so that communication with the new connector can be regulated by the directory service 312. The directory service 312 may include any type and form of storage and/or memory, such as those described in connection with FIGS. 1 and 2. In an embodiment, the directory service 312 may also store user accounts and security information for the user accounts, or the like.

In an embodiment, the computing environment 300 may also include a certificate authority 330 that can receive requests for certificates (such as digital certificates), verify information in the requests, issue certificates, and revoke certificates. Certificate authority 330 is a trusted entity that verifies that signatures are authorized and authentic in the electronic communication context. In other words, the certificate authority 330 acts as a digital analogue to a notary public—to certify that a digital signature in fact belongs to the entity identified in the certificate, according to criteria that would allow the use of that signature in the relevant application (such as establishing trust for a new connector in this disclosure). Typically, the certificate authority 330 provides a certificate including (a) information identifying the certified party, (b) the certified party's public key, and (c) information identifying the certificate authority 330, digitally signed, that is, encrypted with the certificate authority's private key.

In certain embodiment, the certificate authority 330 may be located within and/or managed by the internal computing environment to further improve security of the sensitive information.

In an embodiment, upon receipt of sensitive information at a client device 302 for the first time, that may later be used by a external service 318 to cause an internal resource 308 to perform a desired action, the encryption module 320 included in and/or accessed (via, for example, an Admin UI) by the client device 302 maybe used to create a key and encrypt the sensitive information in with the key. The encryption module 320 may then send the generated key to the configuration service 316 of the external services provider 314, and the encrypted sensitive information to a connector (e.g., first connector 310A). The first connector may share the sensitive information with a group of trusted connectors 310A-N. This ensures that the external service 318 does not have access to and/or does not store the sensitive information in encrypted and/or unencrypted form. At a later time, when the external service 318 requires an action to be performed by an internal service 308, the external service 318 may request a copy of the encryption key from the configuration service 316, and send the received key to a trusted connector 310A-N. The trusted connector may use the key to decrypt the stored encrypted sensitive information, using the received key, and request the required action from the internal service 308 by providing the decrypted sensitive information for authentication.

It will be understood to those skilled in the art that the computing environment described above for sharing or replication of sensitive information between the entities of an internal computing environment (e.g., the connectors), is intended to be illustrative and in no way limiting as to the type of architecture that may be deployed to support the embodiments described herein. Similar principles may be applied for storage and transmission of information between any two computing environments, such as, without limitation internal computing environments of two different entities, internal computing environments of a single enterprise, two external computing environments, and/or an internal computing environment and an external computing environment. Furthermore, similar principles may be applied for sharing of sensitive information between any two entities of a computing environment (e.g., internal computing environment) upon establishment of trust.

Figure 4:
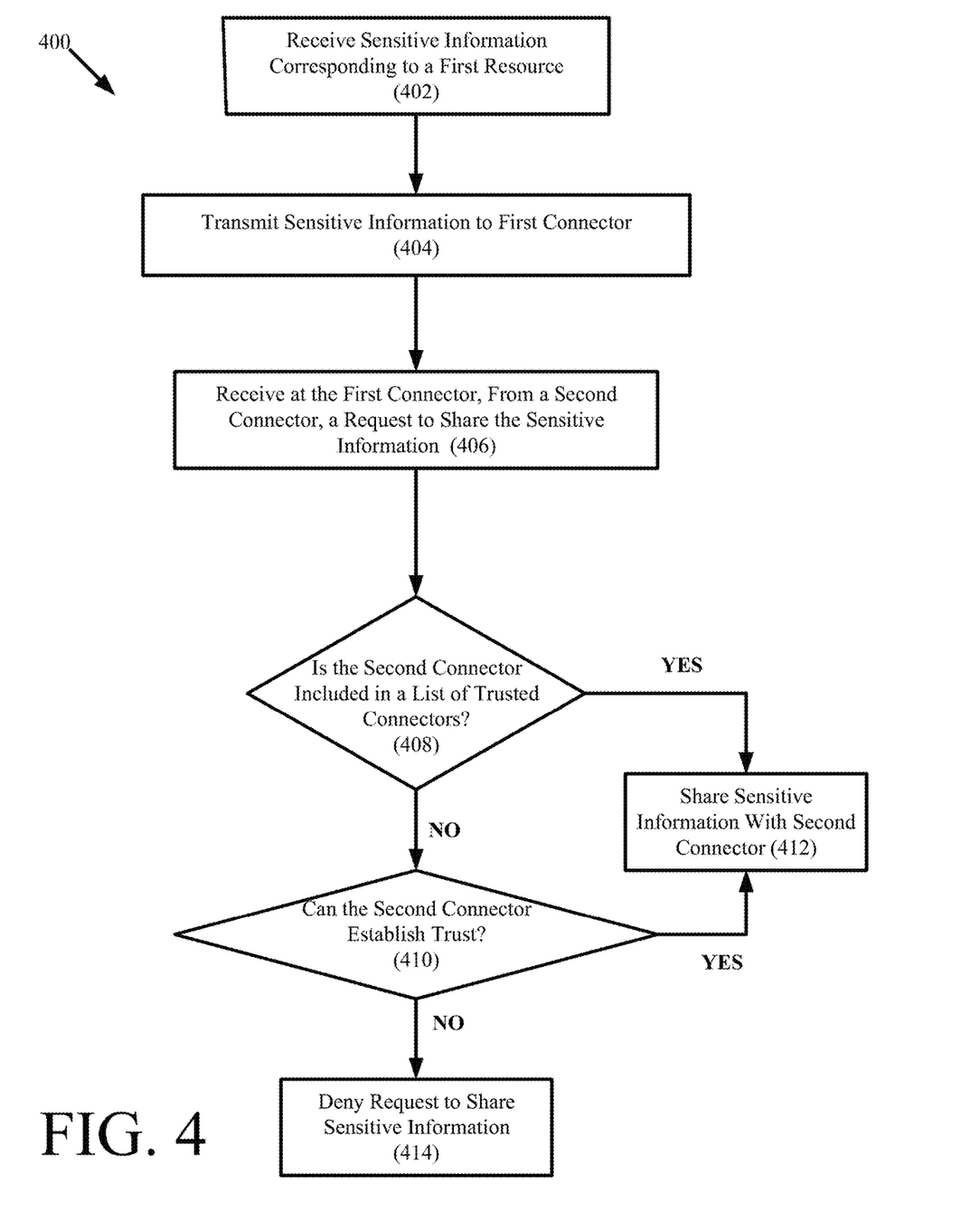
FIG. 4 is a flowchart illustrating an example method for the secure transmission and storage of sensitive information through an external computing environment, and sharing of information between entities of an internal computing environment.

Referring now to FIG. 4, an example method 500 for transmission of sensitive information over an external untrusted computing environment, and sharing of sensitive information between the connectors of a secured enterprise computing environment is illustrated. An example computing environment 300 is illustrated in FIG. 3. Process 400 may be performed by a system, such as system 100. For example, in one or more embodiments, the process 400 illustrated in FIG. 4 and/or one or more steps thereof may be performed by a computing device (e.g., any device of FIGS. 1-2). In other embodiments, the process illustrated in FIG. 4 and/or one or more steps thereof may be embodied in computer-executable instructions that are stored in a computer-readable medium, such as a non-transitory computer-readable memory. Alternatively or additionally, any of the steps in process 400 may be performed on any client device, gateway device, connector, external service provider, and/or third-party server, or computing device. Alternatively or additionally, any of the steps in process 400 may be performed on any browser plug-in, an Admin UI, or the like.

The method 400 may begin at 402 when a client device (or another entity or computing device) of a computing environment receives sensitive information. In an embodiment, for example, the sensitive information may include identity credentials that may subsequently be used to access a first resource (associated with a first computing environment) and/or cause the first resource to perform a desired action. For example, the client device may receive the identity credentials for accessing a resource during the user's initial authentication during log-on. In an embodiment, the client device may receive the information for transmission to a recipient, such as, for example, the first resource, another resource associated with the first computing environment, and/or another resource on a different computing environment from that of the first resource, for subsequent login usage. However, the client device may intercept the sensitive information and store it in an encrypted form at a connector, as discussed below. This ensures that unencrypted sensitive information is not transmitted to and/or stored at an untrusted entity such as, for example, a computing environment that is not the first computing environment or a resource that is not the first resource. For example, an administrator may provide sensitive information that includes a privileged password for authorizing a user to change the user's access credentials corresponding to one or more resources using an SSPR service. The first resource may be any internal and/or external resource.

In an embodiment, the client device may identify that the information received includes sensitive information that may be used to access a first resource and/or cause the first resource to perform a desired action, based on, for example, content of the information (e.g., keyword, tags, etc.), type of the information, user information (e.g., when the user is an administrator), sender device information, recipient resource or application description, intended use of the information, or the like. For example, the client device may determine that the received information contains sensitive information if it includes keywords such as password, username, social security number, account number, or the like. In another example, the client device may determine that the received information contains sensitive information if it includes an authentication token for authenticating a user or a device. Sensitive information may include, without limitation, user identity (e.g., user number, username, etc.) and/or password, personal identification number (PIN), smart card identity, security certificates (e.g., a public key certificate), and features of the user (e.g., as captured by a sensor, such as a fingerprint reader, iris scan, voice recognizer, or other biometric, etc.), or any data used for authentication to access a particular application or resource.

Upon receipt of sensitive information, the client device may transmit (404) the sensitive information to a first connector of a first computing environment for storage where the sensitive information may need to be transmitted through a second computing environment or may be used by a resource associated with the a second computing environment. The first connector may serve as a communication channel between the first computing environment and the second computing environment. In an embodiment, the first computing environment may be a trusted computing environment such as an enterprise's internal computing environment and the second computing environment may be an untrusted external computing environment. Subsequently, the first connector may share the sensitive information with a second connector if the second connector can establish trust via, for example, the untrusted computing environment. (as described below).

Alternatively and/or additionally, the first connector may receive the sensitive information for storage from another entity and/or directly from a user.

In an embodiment, before transmitting the sensitive information to the first connector, the client device may use an encryption module (included in the client device and/or published by an Admin UI via a browser) to generate a key for encryption of the sensitive information, and encrypt the sensitive information, as discussed above. Upon encryption, the client device may transmit the generated key to a configuration service (or another service, resource or computing device), and the encrypted sensitive information to the first connector for storage. The client device may delete the key from memory to prevent the client device from decrypting the encrypted information. In an embodiment, the client device may also delete the unencrypted sensitive information from memory after encryption. Thus, sensitive information required for accessing the first resource is stored in an encrypted form at a first connector associated with one computing environment, and the key for decrypting the information is stored at a configuration service associated with another computing environment that is different from the computing environment associated with the connector.

At 406, the second connector may request the first connector to share the encrypted sensitive information. For example, the second connector may request the sensitive information in response to a second resource receiving a request from a user to cause the first resource to perform an action using a second connector (where the second connector may also serve as a communication channel with the first resource). In an embodiment, the second resource may be associated with the first computing environment. Alternatively, the second resource may be associated with a computing environment that is not the first computing environment. For example, a user may request access to an active directory (first resource) for changing a user's password (action), via an SSPR service (second resource). In an embodiment, the request may include the user's identity credentials that must be authenticated by, for example, comparison with stored identity credentials, before the request for causing the first resource to perform the requested action is granted. In an embodiment, the second resource may receive the request from a user via a client device (e.g., receiver).

Alternatively and/or additionally, the second connector may request the sensitive information such as, for example, upon provision of a new connector to improve the performance of an enterprise computing environment, periodically, upon user request, or the like.

If the second connector is already subscribed as a trusted connector with the directory service, the first connector may share the sensitive information with second connector. Specifically, the first connector may share the sensitive information with one or more trusted connectors included in the list of trusted connectors held at the configuration service (that have already been validated as trusted connectors using the methods described below). However, if the second connector is not already included in the list of trusted connectors, the second connector must first establish trust as described below. While this disclosure describes storing the sensitive information at a connector of an internal computing environment, and sharing of sensitive information between one or more connectors, similar principles may be used for storage and sharing of sensitive information between other entities of an internal computing environment.

At 408, the first connector may determine whether the second connector is a trusted connector included in a list of trusted connectors held by the configuration service. If the second connector is a trusted connector (408: YES) that is included in the list held by the configuration service, the first connector may transmit the encrypted sensitive information to the second connector (412). However, if the second connector is not included in the list of trusted connectors (408: NO), the second connector needs to establish trust, as described below in FIG. 5 (410). If the second connector cannot establish trust, the first connector may deny the request (414). However, if the second connector can establish trust the first connector may transmit the stored sensitive information to the second connector (412).

In an embodiment, upon receipt of the request and if the second connector can access the sensitive information, the second resource may retrieve the key used for encryption of the sensitive information from the configuration service, and may transmit the key and the user request to the second connector. The second connector may use the key to decrypt the previously shared sensitive information and use the decrypted sensitive information to authenticate the user (by, for example, comparing the received identity credentials with the identity credentials included in the decrypted sensitive information using an appropriate authentication module), and/or otherwise use the sensitive information.

It will be understood to those skilled in the art that while the embodiments described herein comprise storing the encryption key at a configuration service, other computing devices or modules of a computing environment that is not the first computing environment may store the key, without deviating from the principles disclosed herein. For example, encryption keys may be stored by a single sign-on service of a second computing environment.

Figure 5:
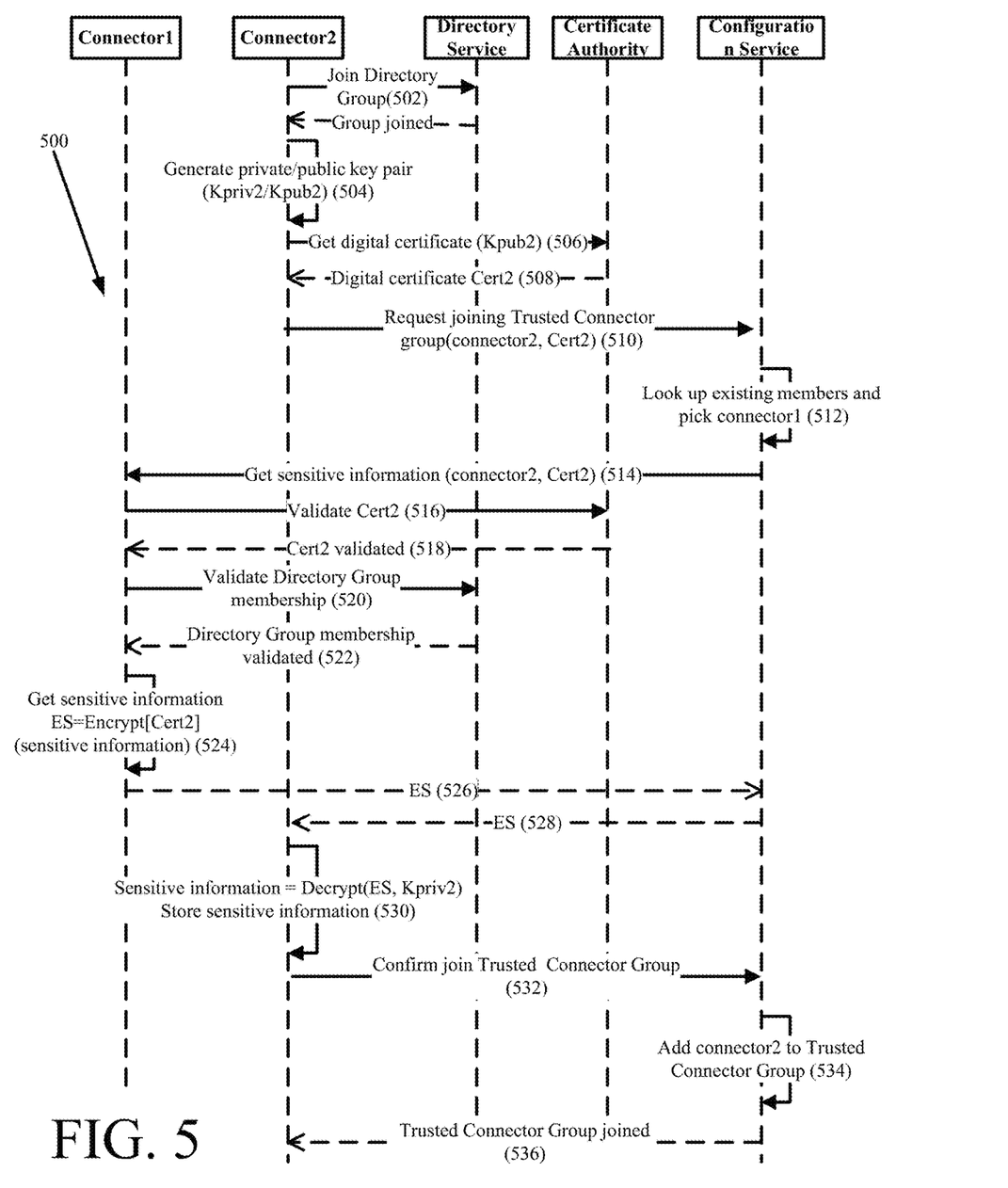
FIG. 5 is a message flow diagram illustrating an example method for sharing and/or replication of sensitive information between the entities of an internal computing environment.

Referring now to FIG. 5, depicts an illustrative message flow 500 to establish that the second connector is a trusted connector (i.e., 414 of FIG. 4) before sharing of sensitive information with the second connector, in a manner such that the external computing environment might not have access to the sensitive information according to one or more illustrative aspects discussed herein. In one or more embodiments, the steps of FIG. 5 and/or one or more steps thereof may be performed by one or more computing devices. In other embodiments, the method illustrated in FIG. 5 and/or one or more steps thereof may be embodied in computer-executable instructions that are stored in a computer-readable medium, such as a non-transitory computer-readable memory. In some instances, one or more of the steps of FIG. 5 may be performed in a different order. In some instances, one or more of the steps of FIG. 5 may be omitted and/or otherwise not performed.

At 502, the second connector may subscribe or register with the directory service associated with the first resource as a trusted connector. In an embodiment, for subscribing the second connector with the directory service, the trust relationship may be verified by, for example, verifying the credential of a user (e.g., administrator credentials) associated with the subscription request.

At 504, the second connector may generate a public/private key pair. Public/private key pair are known in the art and will not be discussed in more detail here. The second connector may transmit the public key to a certificate authority (CA) to request a public key certificate (506). The CA may issue and sign a digital certificate (e.g., a machine certificate such as an X. 509 certificate, a dedicated certificate such as a public key infrastructure (PKI) certificate, or the like) that contains the public key that corresponds to the second connector's private key (508). The CA may verify the authenticity of the second connector, for example if the second connector signs the request for the public key certificate, the CA may verify that the signature is valid before issuing a public key certificate. The CA thus acts as a trusted third party to verify the identity of the second connector. After verifying the signature of the second connector, the CA may sign the public key certificate and return the public key certificate to the second connector.

Upon receipt of the digital certificate, the second connector may send a request to join a group of trusted connectors to the configuration service (510) or another entity that stores a list of trusted connectors that may have access to and/or store the sensitive information. The request includes the digital certificate that contains the second connector's public key. In an embodiment, the group of trusted connectors may correspond to or may be associated with, for example, a resource, a computing environment, sensitive information set, enterprise, user, a computing device, a service provider, or the like, or a combination thereof.

At 512, the configuration service may identify a connector (e.g., the first connector) from the group of trusted connectors that stores the sensitive information and may relay the request including the digital certificate to the identified connector (514). The relayed request also includes information identifying the second connector and the certificate. As discussed above, the configuration services holds a list of trusted connectors that have access to and/or store the sensitive information, and may identify any of the trusted connectors as a connector that stores the sensitive information.

In an embodiment, if the group of trusted connectors is empty, i.e., no connector has previously established trust with the configuration service; the configuration service may create a new group of trusted connectors. The new group of trusted connectors may be associated with, for example, a resource, a computing environment, sensitive information set, enterprise, user, or a combination thereof, and may have access to and/or store confidential information associated with the, a resource, a computing environment, sensitive information set, enterprise, user, or a combination thereof. The configuration service may then add the second connector to the new group without performing steps 514-536.

Upon receipt of the relayed request from the configuration service that includes information identifying the second connector and the certificate, the identified connector may validate the received certificate by sending a validation request with the certificate to the CA to determine whether the CA actually issued and signed the digital certificate (516). The CA may validate the received certificate by, for example, verifying the signature (518). The identified connector may also determine whether the second connector is subscribed to the directory service as a trusted connector by sending information identifying the second connector to the directory service (520). If either the CA or the directory service fails to validate that the digital certificate was actually issued by the CA and/or that the second connector is subscribed to the directory service as a trusted connector, the identified connector may deny the request for sensitive information.

However, if the CA and the directory service validate that the digital certificate is genuine (518) and that the second connector is subscribed to the directory service as a trusted connector (522), the identified connector may encrypt the sensitive information it has stored with the public key included in the digital certificate (524). The identified connector may then transmit (526 and 528) the encrypted sensitive information to the second connector via the configuration service.

The second connector may use its private key corresponding to the public key (from the private public key pair) to decrypt the received sensitive information and store the information (530). The second connector may then request the configuration service to add the second connector to the list of trusted connectors that store the sensitive information (532). The configuration service may add the second connector to the list of trusted connectors (534), and send out a confirmation (536) to the second connector that it has been added to the group of trusted connectors. Thereafter, the second connector will have access to and/or may replicate information received by any of the connectors in the group of trusted connectors.

In an embodiment, if the group of trusted connectors has not received the requested sensitive information before receiving the relayed request from the configuration service (i.e., step 514), the identified connector may notify the configuration service that it does not hold the sensitive information. The configuration service may then add the second connector to the group of trusted connectors without performing steps 516-536. The second connector may then share or replicate the sensitive information upon receipt of such information by any of the connectors if the group of trusted connectors.

It will be understood to those skilled in the art that while the embodiments described herein comprise storing the sensitive information at the plurality of trusted connectors and sharing of sensitive information between the trusted connectors, other computing devices or modules of the first computing environment and/or another computing environment (that is not the second computing environment) may store and/or share the sensitive information, without deviating from the principles disclosed herein. For example, a local storage server, device, and/or internal resource of a first computing environment may store and/or share the sensitive information.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the disclosure should be defined in accordance with the following claims and their equivalents.

We claim:

1. A method for secure sharing of sensitive information in a computing environment, the method comprising, by a first computing entity of a first computing environment:
   receiving first sensitive information from a client device that has been encrypted and which corresponds to the first computing environment configured as a trusted internal computing environment, the first sensitive information having been encrypted using an encryption key held by a configuration service of a second computing environment configured as an untrusted external computing environment;
   receiving, from a second computing entity of the first computing environment, a request to share the first sensitive information between the first computing entity and the second computing entity;
   determining whether the second computing entity is a trusted entity included in a list of trusted computing entities configured to store sensitive information in the first computing environment, the list held by the configuration service;
   in response to determining that the second computing entity is not a trusted entity included in the list of trusted computing entities, determining whether the second computing entity can establish trust by:
      validating a subscription of the second computing entity with a directory service, and
      validating a digital certificate corresponding to the second computing entity with a certificate authority; and
   in response to determining that the second computing entity can establish trust or is a trusted entity, performing the following operations: generating second sensitive information by encrypting the first sensitive information using a public key of a private public key pair generated by the second computing entity and included in the digital certificate; and transmitting the second sensitive information to the second computing entity via the configuration service so as to cause an enablement of at least one operation of the second computing entity;
   wherein the public key is different than the encryption key.

2. The method of claim 1, further comprising, in response to determining that the second computing entity can establish trust, by the configuration service associated with the second computing environment, adding the second computing entity to the list of trusted computing entities.

3. The method of claim 1, further comprising, by a computing device:
   generating the encryption key;
   generating the first sensitive information by encrypting information using the encryption key;
   transmitting the encryption key to the configuration service for storage; and
   transmitting the first sensitive information to the first computing entity.

4. The method of claim 1, wherein the first computing entity is a first connector of the first computing environment and the second computing entity is a second connector of the first computing environment.

5. The method of claim 1, further comprising, in response to determining that the second computing entity cannot establish trust, denying the request to share first sensitive information with the second computing entity.

6. The method of claim 1, determining whether the second computing entity can establish trust further comprises, by the second computing entity:
   joining the directory service, wherein the directory service includes information about one or more trusted entities;
   generating a private public key pair that includes a private key and a public key;
   receiving, from the certificate authority, the digital certificate corresponding to the second computing entity including the public key; and
   transmitting, to the configuration service, a request to join a list of trusted entities, wherein the request comprises the digital certificate corresponding to the second computing entity.

7. The method of claim 1, wherein:
   determining whether the second computing entity can establish trust further comprises receiving, by the first computing entity, from the configuration service, the digital certificate corresponding to the second computing entity, and
   the digital certificate includes a public key of a private public key pair generated by the second computing entity.

8. The method of claim 1, further comprising, by the second computing entity:
   receiving the transmitted second sensitive information; and
   decrypting the received second sensitive information using a private key of the private public key pair.

9. The method of claim 8, further comprising adding, by the configuration service, the second computing entity to the list of trusted computing entities in response to decryption of the second sensitive information by the second computing entity.

10. The method of claim 1, wherein receiving, from the second computing entity, the request to share the first sensitive information is in response to at least one of the following: addition of the second computing entity to the first computing environment, a user request to share the first sensitive information, or a request to access a first resource via the second computing entity using the first sensitive information.

11. A computing system for secure sharing of sensitive information in a computing environment, the system comprising:
- a first computing environment configured as a trusted internal computing environment and comprising at least a first computing entity and a second computing entity;
- a second computing environment configured as an untrusted external computing environment and comprising a configuration service; and
- a non-transitory computer-readable storage medium comprising programming instructions that are configured to implement a method for sharing of sensitive information, wherein the programming instructions comprise instructions that cause the first computing entity to:
  - receive first sensitive information from a client device that has been encrypted and which corresponds to the first computing environment, the first sensitive information having been encrypted using an encryption key held by the configuration service of a second computing environment;
  - receive, from the second computing entity of the first computing environment, a request to share the first sensitive information between the first computing entity and the second computing entity;
  - determine whether the second computing entity is a trusted entity included in a list of trusted computing entities configured to store sensitive information in the first computing environment, the list held by the configuration service;
  - in response to determining that the second computing entity is not a trusted entity included in the list of trusted computing entities, determine whether the second computing entity can establish trust by:
    - validating a subscription of the second computing entity with a directory service, and
    - validating a digital certificate corresponding to the second computing entity with a certificate authority; and
  - in response to determining that the second computing entity can establish trust or is a trusted entity, perform the following operations:
    - generate second sensitive information by encrypting the first sensitive information using a public key of a private public key pair generated by the second computing entity and included in the digital certificate; and
    - transmitting the second sensitive information with the second computing entity via the configuration service so as to cause an enablement of at least one operation of the second computing entity;
  - wherein the public key is different than the encryption key.

12. The system of claim 11, further comprising instructions that cause the configuration service to, in response to determining that the second computing entity can establish trust, add the second computing entity to the list of trusted computing entities.

13. The system of claim 11, further comprising instructions that cause a computing device to:
- generate the encryption key;
- generate the first sensitive information by encrypting information using the encryption key;
- transmit the encryption key to the configuration service for storage; and
- transmit the first sensitive information to the first computing entity.

14. The system of claim 11, wherein the first computing entity is a first connector of the first computing environment and the second computing entity is a second connector of the first computing environment.

15. The system of claim 11, further comprising instructions that cause the first computing entity to, in response to determining that the second computing entity cannot establish trust, deny the request to share the first sensitive information with the second computing entity.

16. The system of claim 11, further comprising instructions that cause the second computing entity to determine whether the second computing entity can establish trust:
- join the directory service, wherein the directory service includes information about one or more trusted entities;
- generate a private public key pair that includes a private key and a public key;
- receive, from the certificate authority, the digital certificate corresponding to the second computing entity including the public key; and
- transmit, to the configuration service, a request to join the list of trusted computing entities, wherein the request comprises the digital certificate corresponding to the second computing entity.

17. The system of claim 11, wherein:
- the instructions to cause the first computing entity to determine whether the second computing entity can establish trust further comprise instructions that cause the first computing entity to receive from the configuration service, the digital certificate corresponding to the second computing entity; and
- the digital certificate includes a public key of a private public key pair generated by the second computing entity.

18. The system of claim 11, further comprising instructions to cause the second computing entity to:
- receive the transmitted second encrypted sensitive information; and
- decrypt the received second encrypted sensitive information using a private key of the private public key pair.

19. The system of claim 18, further comprising instructions to cause the configuration service to add the second computing entity to the list of trusted computing entities in response to decryption of the second encrypted sensitive information by the second computing entity.

20. The system of claim 11, wherein receiving, from the second computing entity, the request to share the first sensitive information is in response to at least one of the following: addition of the second computing entity to the first computing environment, a user request to share the first sensitive information, or a request to access a first resource via the second computing entity using the first sensitive information.

* * * * *